June 20, 1961     W. TERHORST     2,989,355
COMBINED PLASTIC AND METAL SLEEVE-TYPE BEARINGS
Filed May 29, 1958
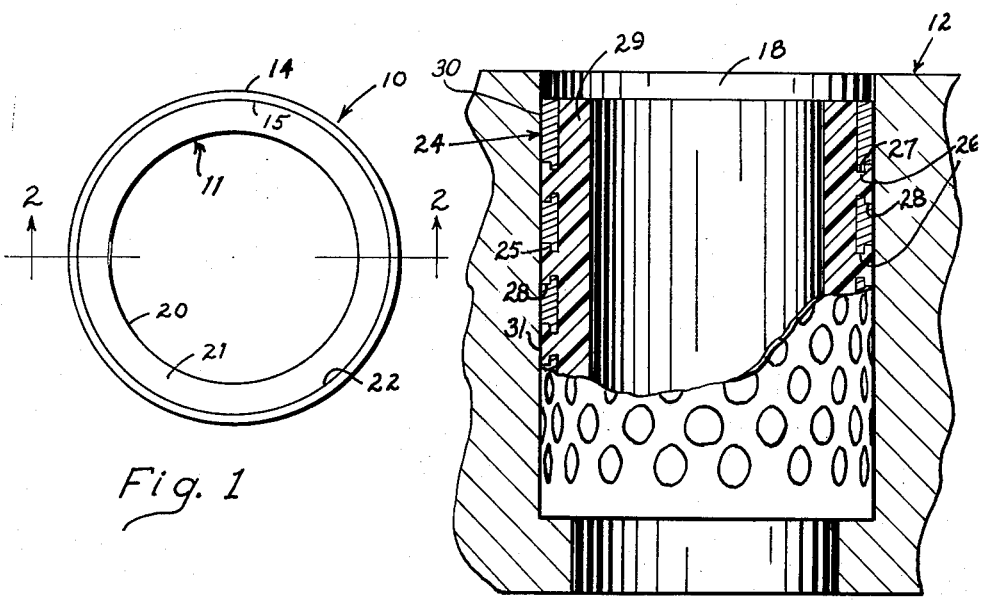
Fig. 3
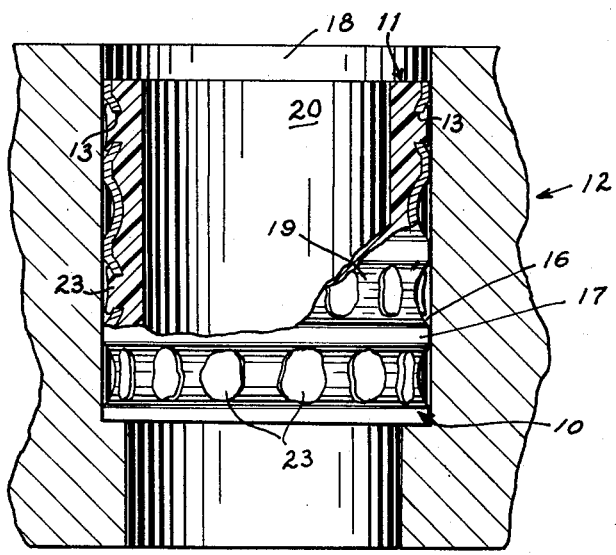
Fig. 1
Fig. 2
INVENTOR.
WILLIS TERHORST
BY
ATTORNEY

United States Patent Office 2,989,355
Patented June 20, 1961

2,989,355
COMBINED PLASTIC AND METAL SLEEVE-TYPE BEARINGS
Willis Terhorst, Minot, N. Dak.
Filed May 29, 1958, Ser. No. 738,740
5 Claims. (Cl. 308—238)

This invention relates to bearings, and more particularly to combined metal and plastic sleeve-type bearings.

It has been recognized for some time that certain synthetic plastic compositions, such as the polyamide known to the trade as "nylon," are tough and resistant to chemical action and physical abrasion. Further, their lubricating characteristics and natural low frictional resistance render them suitable for many bearing usages. However, because of shrinkage and warpage characteristics, most of the bearings made from such material have been confined to those used under low running temperatures and those having small diameters. Trouble is encountered when synthetic plastic material is used in larger bearing structures, particularly if the bearing is of the sleeve-type. Solid nylon sleeve bearings may be press-fitted into a bearing-retaining opening with perfect dimension for a shaft. However, after a period of usage which is shortened by the frequency and the range of warming and cooling cycles, the inner dimension shrinks and may seize the shaft. Concurrently, the press-fit within the retainer is lost and the bearing will become loosened. It has been proposed to insert reinforcing elements within the plastic material to preserve the dimensions of such bearings and to minimize the progressive warpage. In sleeve-type bearings, however, the portion of the plastic material which has been press-fitted still tends to loosen under use. Further, the problem of centering an embedded insert within a plastic body during a high pressure molding operation is great and the molding operation requires an excess of material to flow through and around all sides of the insert.

Where reinforcing inserts are embedded in a plastic bearing, the dissipation of heat is improved little, if any. As a consequence, the plastic material with its poor heat conductivity will warm to a higher temperature than comparable metallic bearings irrespective of good heat conductance in the bearing retainer. As a result, the above noted growth and warpage tendencies of nylon sleeve-bearings is aggravated.

It is an important object of the present invention to overcome the above noted problems and to provide a reinforced plastic sleeve-type bearing which will be economical in manufacture and long wearing in use.

Another object of the invention is to provide a combined metallic and nylon bearing where a good heat transferring press-fit may be maintained under conditions adverse to plain nylon bearings.

A further object of the invention is to provide a bearing of the class described in which a saving of nylon material can be effected while at the same time improving the stability and wearing properties thereof.

A still further object of the invention is to provide an improved metallic and nylon bearing structure which will lend itself to rapid and trouble-free manufacture.

These and other objects and advantages of my invention will more fully appear from the following description, made in connection with the accompanying drawings, wherein like reference characters refer to the same parts throughout the several views and in which:

FIGURE 1 is a top view of my sleeve bearing;

FIGURE 2 is a side elevation of the bearing assembly, partially in vertical section and partially in whole configuration; and FIGURE 3 is a view similar to that of FIGURE 2, showing a modification of the sleeve structure in the assembly.

With continued reference to the drawing, the sleeve bearing comprises generally an open-ended metallic sheath member 10 and an inner molded plastic bearing member 11 held in operating position by a retaining structure 12.

The metallic sheath member 10 may be cylindrical in shape and open at one or both ends to permit the insertion of a shaft in the conventional manner. Sheath 10 may be constructed of tubular stock or constructed of sheath material of sufficient strength and hardness to interfit tightly within the retaining structure 12 in its function as the exterior portion of a sleeve bearing. The sheath 10 is provided with a multiplicity of openings 13 which may be disposed in a patterned relation or otherwise distributed so as to provide a substantial covering of the area of the sheath. The openings 13 extend through the sheath from the outer surface 14 to the inner surface 15 and are provided with an outwardly expanded shoulder area 16 which lies inwardly of the plane defined by the exposed surface 17 of sheath 10. Exposed surface 17 lies in a curvilinear plane and constitutes a substantial portion of the outer surface area 14 and is intended to lie in intimate contact with the corresponding curvilinear inner surface 18 of the retaining structure 12 both to firmly position the bearing and to provide contact with the retaining structure for dissipation of heat from the bearing itself. In the form of the invention shown in FIGURE 2, the expanded shoulder area is attained by a depressed area 19 formed circumferentially of the sheath 10 in the form of grooves or corrugations including the openings 13, as shown. Thus, the space immediately above each of the openings 13 and inwardly of the plane defined by the outer exposed area 17 constitutes an expanded area for locking molded synthetic plastic material and retaining it against shrinkages, which is further described below. The openings 13 may be of any configuration and as close as is consistent with the strength of sheath 10 or as widely separated as is consistent with the holding capacity of the sheath with respect to the synthetic plastic bearing 11. The corrugated structure shown in FIGURE 2 serves admirably for this purpose since the strength and contact of the sheath in press-fit relation with the retaining structure 12 is consistent with the holding power of the structure against warpage and shrinkage of the molded plastic bearing.

The plastic bearing member 11 may be constructed of thermoplastic material such as nylon and injection molded within the sheath 10 with a core member, not shown, disposed centrally thereof. The synthetic plastic bearing member 11 has an inner bearing surface 20 and a thin annular body 21 terminating outwardly in an outer surface 22 which lies in intimate contact with the inner surface 15 of the metallic sheath 10. In the molding procedure, the plastic material is extruded under pressure and is forced outwardly through each of the opening 13. The sheath 10 may be retained in a mold having a cylindrical conformation similar to that of the bore defined by inner surface 18 in the retainer 12. Thus the plastic bearing material may be forced outwardly of each of the openings until it fully occupies the space formed by the grooves or corrugations defining the shoulder areas 16 and lying inwardly of the plane defined by the outermost exposed area 17, as shown in FIGURE 2. If the molding pressure is inadequate, or if it be desired to conserve on material, only that amount of plastic bearing material required to pass through the openings itself need be employed. In such case, a button 23 will be automatically produced within the expanded shoulder area surrounding each of the openings 13 and, upon cooling, of the plastic bearing material, will firmly hold it in interlocked relation with each of the openings.

Another form of the sheath element is shown in FIGURE 3 and is there generally indicated as 24. In this form of the invention, there are no corrugations or grooves formed in the sheath but the walls remain straight and in the plane lying in intimate contact with inner surface 18 of the bearing retainer 12. The expanded shoulder area 25 is achieved by forming openings 26 in such a manner that the inner portion 27 is of lesser diameter than the outer portion 28. During the injection molding process, the plastic bearing member 29 is extruded through each of the openings 25 so as to fill both the inner portion 27 and outer portion 28 of each of the openings. When thus extruded, the entire sleeve presents a smooth curvilinear area, a portion of which constitutes an outer exposed surface 30 of the metallic sheath 24 and the remainder comprising buttons 31 filling the expanded shoulder area defined by the outer portion 28 of each of the openings 25.

As in the first form of the invention illustrated in FIGURE 2, the form just described will interlock with, and retain, the plastic bearing member 29 against shrinkage or other distortion.

When my sleeve-type bearing is inserted in a bearing retainer 12, a substantial portion of the outer exposed metallic area is press-fitted into intimate contact with the bore of the retainer 12. The metallic character of the sheath is such as to maintain this press-fit relation irrespective of the warming and cooling cycles which may be applied to it during usage. The inner molded plastic bearing member 11, or 29 in the alternate form, if unrestrained, would tend to deform over a period of time under the influence of warming and cooling. The deformity is intensified if the plastic material lies under stress and, hence, a press-fit cannot be maintained under such conditions with the plastic merely lying in a press-fit relation within the bore of the retainer structure. However, when a portion of the outer area represented by the buttons 23 and 31 in the respective alternate forms are interlocked with the sheath 10 or 24, then sufficient stress is maintained upon the molded plastic material to prevent the shrinkage and warpage thereof under the influence of temperature changes. For this reason, the inner surfaces of the plastic material maintain their dimension and neither expand nor contract against a shaft rotating therein. The reliability and the wearing life of my sleeve-type bearing is many times that of a pure plastic bearing member which is not restrained against deformation. Further, I can obtain such reliability and long wear with a lesser quantity of bearing material for equivalent sized shafts and maintain a constant press-fit relation in a bearing retainer which will not become loosened even over extended periods of time. The plastic buttons do not break or become separated from the metallic sheath and the intimate bond between the sheath and the bearing material is maintained throughout the life of the bearing.

It will, of course, be understood that various changes may be made in the form, details, arrangements and proportions of the parts without departing from the scope of my invention as set forth in the appended claims.

What I claim is:

1. A sleeve-type bearing which comprises, an open-ended outer metallic sheath member having an outwardly facing surface, a substantial portion of which is exposed and lies in a curvilinear plane, said sheath member having a multiplicity of openings formed therethrough, each of said openings having an outwardly expanded shoulder area lying inwardly of the plane defined by the exposed surface of the sheath, and an inner molded plastic bearing member having a cylindrical inner wall and lying within said sheath and in contact therewith, integral portions of said plastic bearing member extending through said multiplicity of openings and over the associated expanded shoulder areas whereby to firmly retain the plastic bearing member against shrinkage and warpage.

2. A sleeve-type bearing which comprises, a rigid metallic sheath having a generally cylindrical heat-conducting outer surface, said sheath having a multiplicity of recessed areas formed in said heat-conducting outer surface, each having an outwardly flared opening therethrough, and an inner molded plastic bearing member having a cylindrical inner wall and lying within said sheath and in contact therewith, integral portions of said plastic bearing member extending through said multiplicity of openings and over the associated expanded shoulder areas whereby to firmly retain the plastic bearing member against shrinkage and warpage.

3. A sleeve-type bearing which comprises, an open-ended outer metallic sheath member having an outwardly facing heat-conducting surface, a substantial portion of which is exposed, said sheath member having a multiplicity of openings formed therethrough, each of said openings having an outwardly expanded shoulder area lying inwardly of the plane defined by the exposed surface of the sheath, and an inner molded plastic bearing member having an inner cylindrical wall and formed within said sheath in intimate bonded relation thereto, integrally formed buttons extending outwardly from the plastic bearing member through respective openings, each in interlocked engagement with an expanded shoulder area, said buttons lying within the plane defined by the outermost exposed surface of the sheath whereby to permit the sheath to maintain direct rigidifying and heat-conducting contact when force-fitted as a sleeve bearing.

4. A bearing assembly which comprises, an open-ended outer metallic sheath member having an outwardly facing heat-conducting surface, a substantial portion of which is exposed, said sheath member having a multiplicity of openings formed therethrough, each of said openings having an outwardly expanded shoulder area lying inwardly of the plane defined by the exposed surface of the sheath, an inner molded plastic bearing member having a cylindrical inner wall and lying within said sheath and in contact therewith, integral portions of said plastic bearing member extending through said multiplicity of openings and over the associated expanded shoulder areas whereby to firmly retain the plastic bearing member against shrinkage and warpage, and a retaining structure holding said sheath and bearing members securely in place, the exposed surface of said sheath lying in press-fitted and heat-conducting engagement therewith.

5. A bearing assembly which comprises, an open-ended outer metallic sheath member having an outwardly facing heat-conducting surface, a substantial portion of which is exposed, said sheath member having a multiplicity of openings formed therethrough, each of said openings having an outwardly expanded shoulder area lying inwardly of the plane defined by the exposed surface of the sheath, an inner molded plastic bearing member having an inner cylindrical wall and being molded within said sheath and in intimate contact therewith, integrally formed buttons extending outwardly from the plastic bearing member through respective openings each in interlocked engagement with an expanded shoulder area, said buttons lying within the plane defined by the outermost exposed surface of the sheath whereby to permit the sheath to maintain direct contact when force-fitted as a sleeve bearing, and a retaining structure holding said sheath and bearing members securely in place, at least a substantial area of the exposed surface of said sheath lying in press-fitted and heat-conducting engagement therewith.

References Cited in the file of this patent

UNITED STATES PATENTS

| | | |
|---|---|---|
| 2,622,949 | Cotchett | Dec. 23, 1952 |
| 2,702,730 | Ivanoff | Feb. 22, 1955 |
| 2,768,034 | Skinner | Oct. 23, 1956 |